United States Patent [19]

Ochi et al.

[11] Patent Number: 4,547,811

[45] Date of Patent: Oct. 15, 1985

[54] METHOD AND APPARATUS FOR GRAY LEVEL SIGNAL PROCESSING

[75] Inventors: Hiroshi Ochi; Nobuji Tetsutani, both of Kanagawa, Japan

[73] Assignee: Nippon Telegraph & Telephone Public Corporation, Tokyo, Japan

[21] Appl. No.: 392,155

[22] Filed: Jun. 25, 1982

[30] Foreign Application Priority Data

Jun. 29, 1981 [JP] Japan .................................. 56-102057
Sep. 11, 1981 [JP] Japan .................................. 56-143418
Mar. 6, 1982 [JP] Japan .................................. 57-35557
May 26, 1982 [JP] Japan .................................. 57-87963

[51] Int. Cl.$^4$ ............................................. H04N 1/40
[52] U.S. Cl. .................................. 358/280; 358/282; 358/283; 382/9; 382/53
[58] Field of Search ............... 358/283, 280, 298, 282, 358/138; 382/53, 52, 50, 81, 9

[56] References Cited

U.S. PATENT DOCUMENTS

| | | | |
|---|---|---|---|
| 4,403,257 | 9/1983 | Hsieh .................................. | 358/280 |
| 4,414,581 | 11/1983 | Kato et al. ........................... | 358/283 |
| 4,442,544 | 4/1984 | Moreland et al. ..................... | 382/53 |
| 4,447,830 | 5/1984 | Stoffel ................................. | 358/283 |
| 4,449,150 | 5/1984 | Kato .................................... | 358/283 |
| 4,475,127 | 10/1984 | Iluma ................................... | 358/283 |

Primary Examiner—Edward L. Coles, Sr.
Attorney, Agent, or Firm—Burgess, Ryan & Wayne

[57] ABSTRACT

A gray level signal processing method determines whether an image signal derived from an original document belongs to the character image area which needs high resolution or the continuous-tone image area which needs gray level reproduction such as for photographs, and quantizes the signal in a quantization method suitable for the image area to which the signal belongs. The process comprises the steps: (a) picture image is divided into blocks each composed of m-by-n picture elements; (b) the maximum optical density level ($P_{max}$) and the minimum optical density level ($P_{min}$) are detected in each block; (c) the difference value ($P_\Delta = |P_{max} - P_{min}|$) between the maximum and minimum optical density levels is calculated; (d) the image area to which the block belongs is determined according to the difference value ($P_\Delta$); and (e) the optimum one of quantization processing methods is selected according to the result of the determination, and the optical density level of each picture element in the block is quantized in the selected processing quantization method. The method can be applied to the process of facsimile system including continuous-tone or halftone information or also to the process in a copy machine which reads and records a picture in units of picture elements.

11 Claims, 40 Drawing Figures

|   | 1 |   |   | 2 |   |   |   |   | 3 |   |   |   |   | 4 |   |
|---|---|---|---|---|---|---|---|---|---|---|---|---|---|---|---|
| 0 | 1 | 1 | 2 | 3 | 3 | 4 | 4 | 4 | 0 | 0 | 0 | 0 | 0 | 0 | 0 |
| 0 | 1 | 2 | 2 | 3 | 3 | 4 | 4 | 4 | 0 | 0 | 1 | 2 | 3 | 3 | 3 |
| 1 | 1 | 2 | 2 | 3 | 4 | 4 | 4 | 5 | 1 | 0 | 2 | 11| 12| 12| 13|
| 1 | 1 | 2 | 2 | 3 | 3 | 3 | 4 | 4 | 1 | 0 | 2 | 12| 7 | 6 | 2 |
| 2 | 3 | 4 | 5 | 5 | 5 | 5 | 5 | 4 | 2 | 0 | 3 | 12| 2 | 0 | 0 |
| 3 | 3 | 5 | 6 | 6 | 6 | 6 | 6 | 5 | 2 | 0 | 2 | 12| 2 | 0 | 0 |
| 4 | 5 | 6 | 6 | 6 | 7 | 7 | 7 | 5 | 3 | 0 | 3 | 12| 2 | 0 | 0 |
| 4 | 5 | 6 | 6 | 6 | 7 | 7 | 8 | 5 | 3 | 0 | 3 | 13| 2 | 0 | 0 |

5, 6, 7, 8

| 1 | 9 | 3 | 11 |
|---|---|---|----|
| 13| 5 | 15| 7 |
| 4 | 12| 2 | 10 |
| 16| 8 | 14| 6 |

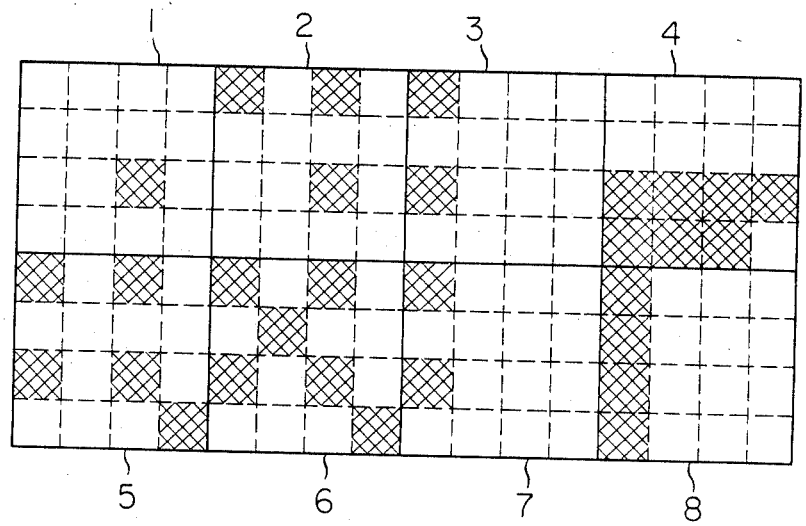

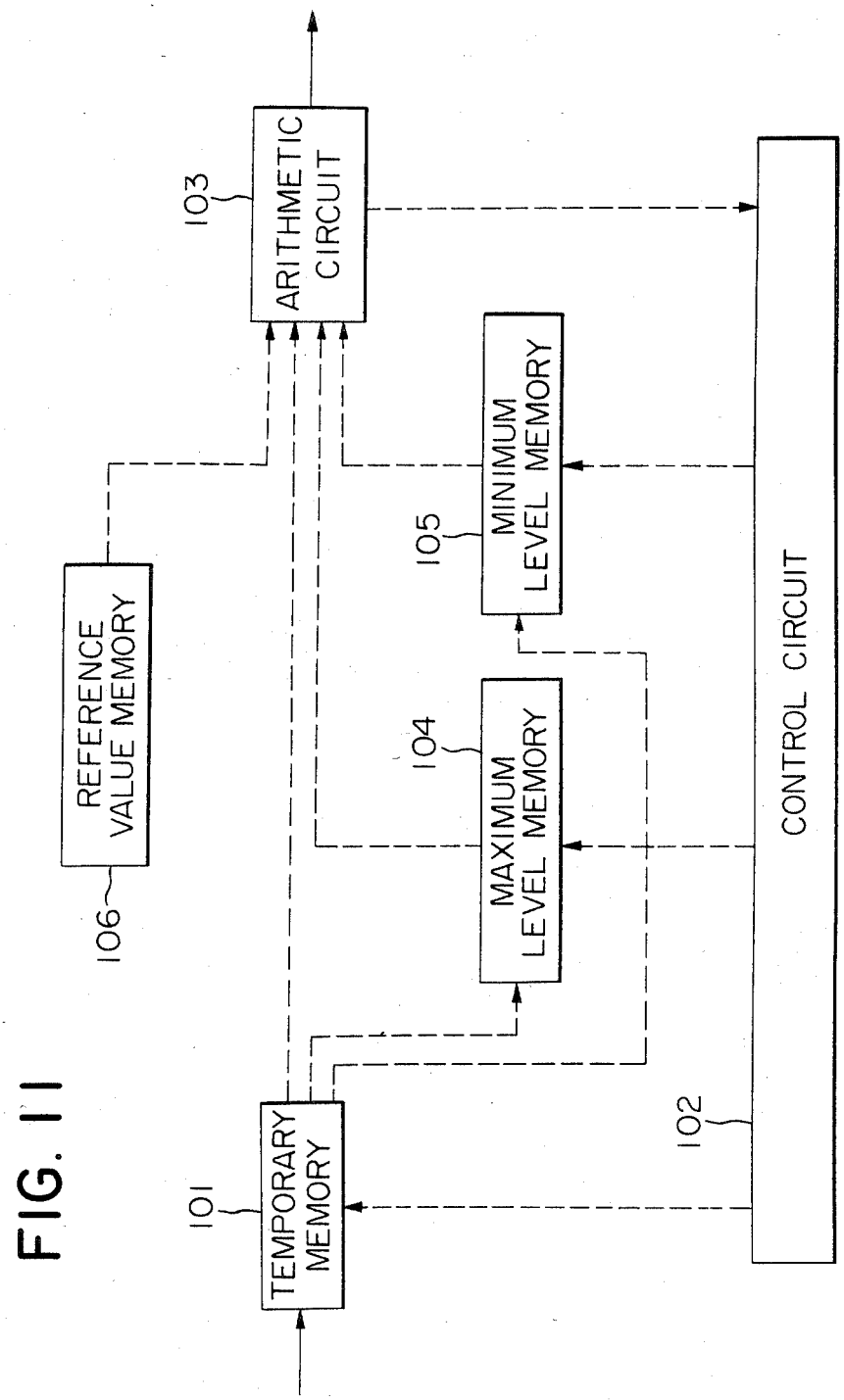

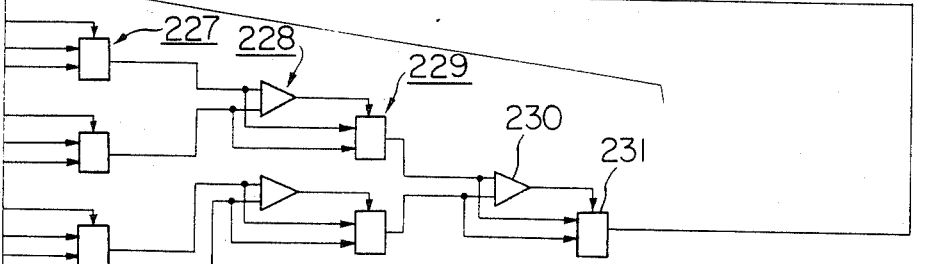

FIG. 13A

| 1 | 5 | 1 | 5 |
|---|---|---|---|
| 9 | 13 | 9 | 13 |
| 1 | 5 | 1 | 5 |
| 9 | 13 | 9 | 13 |

FIG. 13B

| 2 | 6 | 2 | 6 |
|---|---|---|---|
| 10 | 14 | 10 | 14 |
| 2 | 6 | 2 | 6 |
| 10 | 14 | 10 | 14 |

FIG. 13C

| 3 | 7 | 3 | 7 |
|---|---|---|---|
| 11 | 15 | 11 | 15 |
| 3 | 7 | 3 | 7 |
| 11 | 15 | 11 | 15 |

FIG. 13D

| 4 | 8 | 4 | 8 |
|---|---|---|---|
| 12 | 16 | 12 | 16 |
| 4 | 8 | 4 | 8 |
| 12 | 16 | 12 | 16 |

FIG. 14

| D5 | D2 | D5 | D2 | D5 | D1 | D1 | D1 |
|----|----|----|----|----|----|----|----|
| D1 | D1 | D1 | D1 | D1 | D1 | D1 | D1 |
| D5 | D4 | D5 | D4 | D5 | D1 | D1 | D1 |
| D1 | D1 | D1 | D1 | D1 | D1 | D1 | D1 |

| D1 | D1 | D1 | D1 |
|----|----|----|----|
| D1 | D2 | D2 | D2 |
| D4 | D4 | D4 | D5 |
| D4 | D3 | D3 | D1 |
| D4 | D1 | D1 | D1 |
| D4 | D1 | D1 | D1 |
| D4 | D1 | D1 | D1 |
| D5 | D1 | D1 | D1 |

| 3 | 3 | 3 | 3 |
|---|---|---|---|
| 3 | 3 | 3 | 3 |
| 3 | 3 | 3 | 3 |
| 3 | 3 | 3 | 3 |

FIG. 15B

| 6 | 6 | 6 | 6 |
|---|---|---|---|
| 6 | 6 | 6 | 6 |
| 6 | 6 | 6 | 6 |
| 6 | 6 | 6 | 6 |

FIG. 15C

| 10 | 10 | 10 | 10 |
|---|---|---|---|
| 10 | 10 | 10 | 10 |
| 10 | 10 | 10 | 10 |
| 10 | 10 | 10 | 10 |

FIG. 15D

| 13 | 13 | 13 | 13 |
|---|---|---|---|
| 13 | 13 | 13 | 13 |
| 13 | 13 | 13 | 13 |
| 13 | 13 | 13 | 13 |

FIG. 17A

| 1 | 2 | 1 | 2 |
|---|---|---|---|
| 3 | 4 | 3 | 4 |
| 1 | 2 | 1 | 2 |
| 3 | 4 | 3 | 4 |

FIG. 17B

| 5 | 6 | 5 | 6 |
|---|---|---|---|
| 7 | 8 | 7 | 8 |
| 5 | 6 | 5 | 6 |
| 7 | 8 | 7 | 8 |

FIG. 17C

| 9 | 10 | 9 | 10 |
|---|---|---|---|
| 11 | 12 | 11 | 12 |
| 9 | 10 | 9 | 10 |
| 11 | 12 | 11 | 12 |

FIG. 17D

| 13 | 14 | 13 | 14 |
|---|---|---|---|
| 15 | 16 | 15 | 16 |
| 13 | 14 | 13 | 14 |
| 15 | 16 | 15 | 16 |

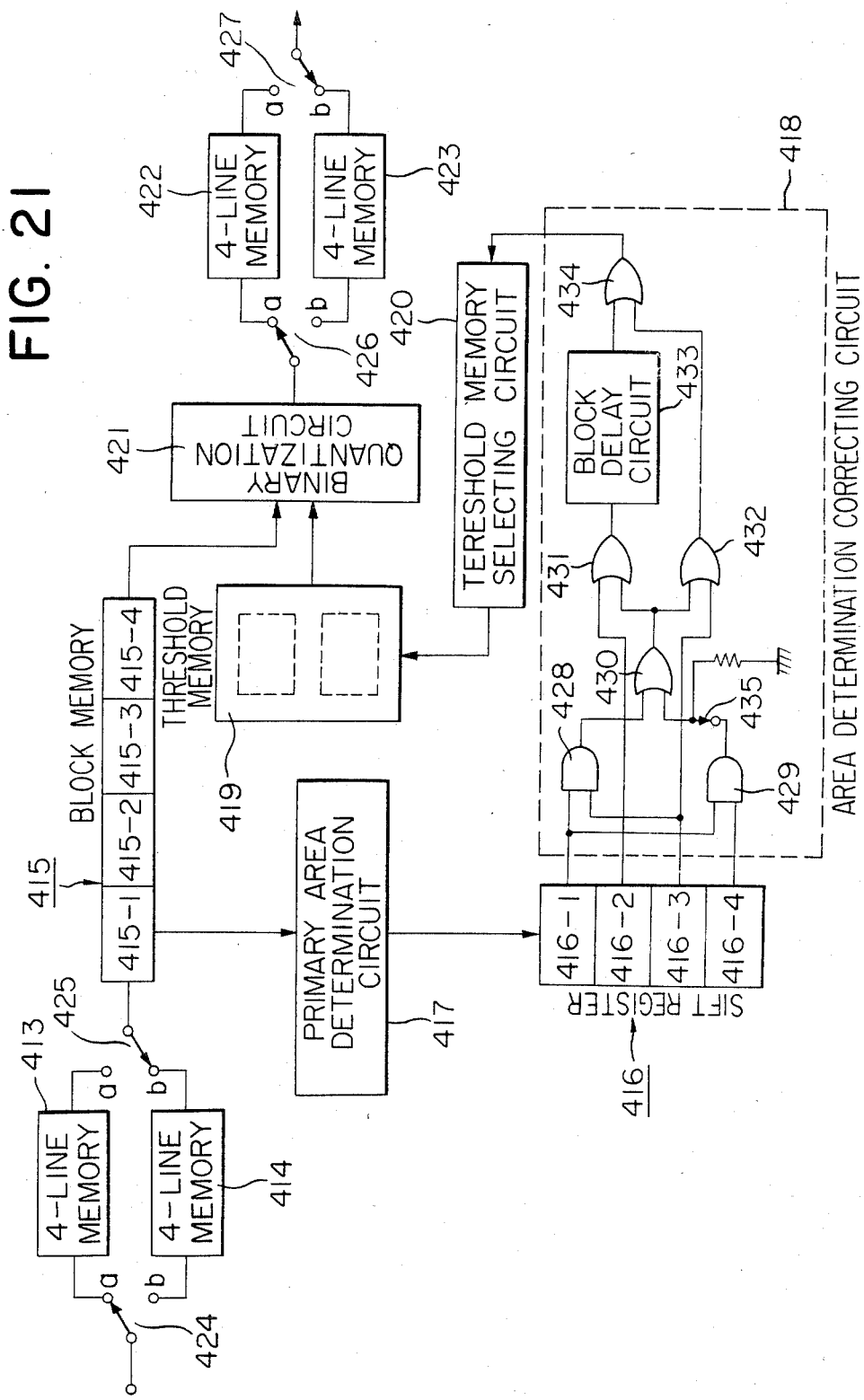

METHOD AND APPARATUS FOR GRAY LEVEL SIGNAL PROCESSING

BACKGROUND OF THE INVENTION

1. Field of the Invention

The present invention relates to a method for determining an image area to which image signals derived from an original document belong, and to a gray level signal processing method for reproducing a high quality picture from an original document including continuous-tone images such as photographs and characters and line drawings. The present invention also relates to an apparatus used for these methods.

2. Description of the Prior Art

In the past the most popular halftone reproduction method of this kind has been the ordered dither method which employs a threshold matrix with its binary threshold levels being varied depending on the position of the picture element. The picture signal of each picture element is compared with each threshold level of the threshold matrix and pictorial image signals are quantized into "black" and "white" corresponding to signal levels higher than the threshold level and signal levels lower than the threshold level, respectively, so that the number of black picture elements increases as the picture signal approaches the black level, thereby to reproduce pseudo half-tones.

However, this method provides inferior resolution as compared with the binary reproduction method where each picture element is simply quantized into binary value with reference to a constant threshold level, resulting disadvantageously in a poor picture quality for portions including characters where high resolution is required.

It can be considered in order to reproduce a satisfactory black and white picture image such as characters and line drawings without including gray levels (referred to as "character image") together with an image such as a photograph including gray levels (referred to as "continuous-tone image"), the continuous-tone image portion (referred to as "continuous-tone image" area) and the character image portion (referred to as "character image area"), are separated each other so that the former is reproduced by the ordered dither method while the latter is reproduced by the simple quantization method. However, there has been no appropriate method for distinguishing the continuous-tone image area and the character image area. For example, the continuous-tone image area has less optical density variation in the image, and after it has been quantized in binary by the ordered dither method, it can be identified from the periodic characteristics of the black or white picture element. This method, however, does not provide a satisfactory accuracy of distinction.

The IBM Technical Disclosure Bulletin, Vol. 19, No. 9, pp. 3566-3568 discloses a method of determining the image area by comparing each picture element with adjacent picture elements. This method takes too long a time for processing, since determination is made for each picture element, and it is not suitable for practical application.

OBJECTS AND SUMMARY OF THE INVENTION

Accordingly, it is an object of the present invention to provide a method and apparatus for determining correctly and easily the image area to which image signals produced from an original document including one of images with less gray levels of optical density such as characters and line drawings, and images with many gray levels of optical density such as photographs, or combination thereof belong.

It is another object of the present invention to provide a method and apparatus for gray level signal processing, wherein images with less gray levels such as characters and line drawings, and images with many gray levels such as photographs are reproduced in high quality.

In general, a character image has a characteristic in which the optical density level varies sharply and a continuous-tone image such as a photograph has characteristics in which the optical density level varies gradually. The image area determination method according to the present invention utilizes such characteristics of images for determining the area of each image portion, and comprises the following processing steps.

(a) A step of dividing a pictorial image into blocks each composed of a plurality of picture elements.

(b) A step of detecting for each block the maximum optical density level ($P_{max}$) and the minimum optical density level ($P_{min}$) of optical density levels of picture elements.

(c) A step of obtaining the difference ($P_\Delta$) between the maximum optical density level ($P_{max}$) and the minimum optical density level ($P_{min}$).

(d) A step of determining the image area of the block depending on the value ($P_\Delta$) of the difference of the optical density levels.

The above-mentioned image area falls into two areas of a character image area and a continuous-tone image area, or three areas including an intermediate area in addition to the above two areas, or may fall into even more areas.

The image area determination method according to the present invention carries out the primary determination for separating each block into the continuous-tone area and the character image area, thereafter when blocks on both sides of three or four consecutive blocks have been determined to be a character image area, the intermediate block is correstively determined to be the character image area irrespective of the result of a primary determination, thereby upgrading the accuracy of determination.

The apparatus of the present invention used in the foregoing image area determination method comprises memory means for temporarily storing optical density levels of picture elements for one block, arithmetic means for comparing optical levels of picture elements stored in the memory means so as to obtain the maximum optical density level ($P_{max}$) and the minimum optical density level ($P_{min}$), arithmetic means for calculating the difference ($P_\Delta$) between the maximum optical density level and the minimum optical density level, and determinating means for comparing the difference of the optical density levels ($P_\Delta$) with at least one reference value ($m_1, m_2, \ldots,$ and $m_n$, where $m_1 \leq m_2 \leq \ldots \leq m_n$), and providing a signal which represents the image area of that block in accordance with the result of the comparison.

A feature of the gray level signal processing method according to the present invention is that the image area is determined by using the foregoing image area determination method, one of a plurality of conventional halftone reproduction means is selected according to the result of the determination, and the optical density level of each picture element within a block is quantized by the selected halftone reproduction means.

According to one aspect of the gray level signal processing method of the present invention, one of a plurality of threshold matrices is selected depending on the result of determination of the image area to which a block belongs, and the optical density level of each picture element within the block is quantized in binary by using the selected threshold matrix.

According to another aspect of the gray level signal processing method of the present invention, a set of threshold matrices are selected out of a plurality of threshold matrix sets, each set including a plurality of threshold matrices, in accordance with the result of determination of the image area for a block, and the optical density level of each picture element within the block is quantized in multi-level by using the selected threshold matrix set.

BRIEF DESCRIPTION OF THE DRAWINGS

The present invention, together with its various features and advantages, can be readily understood from the following more detailed description presented in conjunction with the following drawings, in which:

FIGS. 4A, 4B, 6A, 6B, 6C and 6D exemplify the threshold matrix used for the process of binary quantization in the ordered dither method;

FIG. 5 shows the result of the binary quantization process for the image of FIG. 1 by the method of the present invention, wherein blocks 4 and 8 are simply quantized in binary as the character image area with a thereshold level of k=6, block 7 is quantized in binary as the intermediate area using the threshold matrix of FIG. 4A, and blocks 1, 2, 3, 5 and 6 are quantized in binary using the threshold levels of FIG. 2;

FIGS. 7A to 7C show a set of illustrations useful to explain that all picture elements in a block are corrected to white when the mean optical density level of the block is smaller than the predetermined level, where FIG. 7A shows an example of the image signal levels read out from the original document, FIG. 7B shows the result of the binary quantization process for the image shown in FIG. 7A without correction, and FIG. 7C shows the result of correction for the image shown in FIG. 7B;

FIGS. 8A to 8D exemplify a set of threshold matrices used for the embodiment of the present invention for separating an image into four image area, where FIG. 8A shows a threshold matrix used for the caracter image area, FIG. 8D shows a threshold matrix used for the continuous-tone image area, and FIGS. 8B and 8C show threshold matrices used for the intermediate area;

FIG. 9 shows an example of a threshold matrix used in the present invention, wherein the size of the threshold matrix differs from the block size;

FIG. 11 is a block diagram showing an example of the image area determination circuit used in the apparatus of FIG. 10;

FIGS. 13A to 13D exemplify a set of threshold matrices for quantizing picture elements in multi-levels in accordance with the present invention, and show an example of quantization in five levels;

FIG. 14 shows the result of the process using the threshold matrices shown in FIGS. 13A to 13D;

FIGS. 15A to 15D exemplify a set of threshold matrices used for the multi-level quantizing process for a block which has been categorized as the character image area;

FIG. 16 shows the result of the process using the threshold matrix of FIGS. 15A to 15D for blocks 4 and 8 in FIG. 1 which have been categorized as the character image area;

FIGS. 17A to 17D exemplify a set of threshold matrices used for the multi-level quantizing process for blocks which have been categorized as the intermediate area or the continuous-tone image area;

FIG. 21 is a block diagram showing an area determination correcting circuit embodying the present invention.

DETAILED DESCRIPTION OF THE INVENTION

Figures 1, 2, 3:
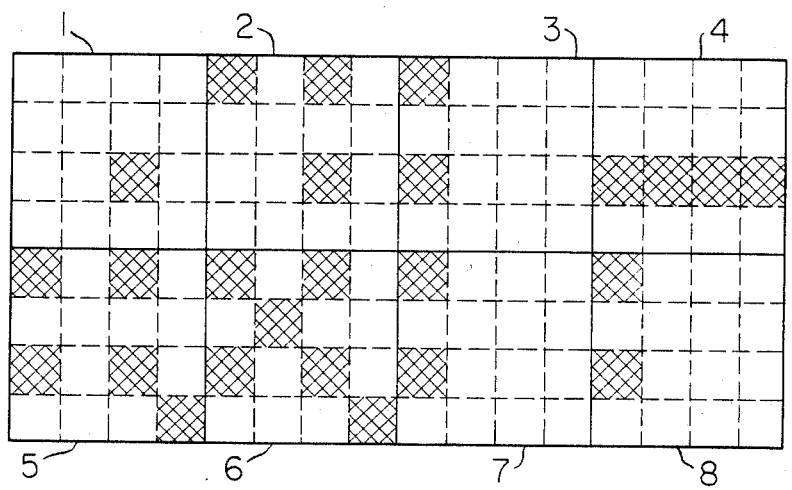
FIG. 1 shows an example of an 8-block pictorial image, each block including 4-by-4 picture elements, wherein numbers enclosed by dotted lines represent the optical density levels of respective picture elements.
FIG. 2 shows an example of the arrangement of a threshold matrix used in the conventional ordered dither method, wherein numbers enclosed by dotted lines represent threshold values.
FIG. 3 shows the resultant image for the image shown in FIG. 1 which is processed in binary quantization by use of the threshold matrix shown in FIG. 2, wherein hatched portions represent black picture elements and blank portions represent white picture elements.

According to the present invention, an image is divided into a plurality of blocks each including a plurality of picture elements. FIG. 1 depicts an example of an image which is divided into eight blocks each including 16 (4 by 4) picture elements. A small square defined by the dashed line represents a picture element and each of large squares 1 through 8 defined by the solid line represents a block. The number given to each picture element represents the optical density level detected on the original picture, where "0" represents white, "16" represents black, and intermediate numbers represent gray in optical density. Although the optical density level is expressed in integer in FIG. 1, it is not always necessary to use integers.

In the next step, the optical density level of each picture element is checked to find the maximum level $P_{max}$ and the minimum level $P_{min}$ of each block. For example, in FIG. 1, block 1 provides $P_{max}=2$ and $P_{min}=0$, block 2 provides $P_{max}=4$ and $P_{min}=3$, block 3 provides $P_{max}=5$ and $P_{min}=0$, block 4 provides $P_{max}=13$ and $P_{min}=0$, and so on.

Next, the difference $P_\Delta$ between the maximum level $P_{max}$ and the minimum level $P_{min}$ is obtained and it is compared with predetermined reference values $m_1$ and $m_2$ ($0 \leq m_1 \leq m_2 \leq 16$), so that difference values are classified into three groups: (i) $P_\Delta \geqq m_2$, (ii) $m_2 \leqq P_\Delta \leqq m_1$ and (iii) $P_\Delta \leqq m_1$.

Depending on the classification of the difference $P_\Delta$ of the optical density levels of each block, one of a plurality of threshold matrices is selected for quantizing the optical density level of each picture element within the block.

(i) $P_\Delta \geqq m_2$

A block of this category generally belongs to a character image area where characters and graphical patterns are expressed by black and white, and therefore, this block needs to be processed by the binary quantization method having high spatial resolution. Accordingly, a threshold matrix having a single threshold level is used for quantizing the optical density level of each picture element. The optical density level of each picture element is compared with this threshold level k so that a picture element with an optical density level lower than the threshold is appointed to be a white picture element and a picture element with an optical density level higher than the threshold is appointed to be a black picture element.

(ii) $m_2 > P_\Delta \geqq m_1$

A block of this category belongs to an area characterized between the character image area and the continuous-tone image area. Therefore, this block is processed so as to get high resolution by providing a less number of reproduction tones than the continuous-tone image area. Accordingly, a threshold matrix with a variety of threshold levels distributed in a narrow range as shown in FIGS. 4A and 4B is used.

(iii) $P_\Delta < m_1$

A block of this catagory mainly belongs to the continuous-tone image area which needs the reproduction of gray levels such as seen in a photograph. This block is processed to reproduce halftones. More particularly, a dither threshold matrix as shown in FIG. 2 is used to carry out binary quantization for the optical density level of each picture element within the block. Some block in the continuous-tone image area may be categorized as $P_\Delta \geqq m_2$. However, such block is a portion of high contrast in the continuous-tone image and it is not important to reproduce gray level. Therefore, the picture quality is not deteriorated by the binary, quantization process with a constant threshold. Some block in the character image may be categorized as $P_\Delta < m_1$. However, the picture quality is not so much deteriorated. And many of these cases are corrected by the method mentioned later.

For example, when the image of FIG. 1 is processed by the method of the present invention with parameters being set as: $m_1 = 5$, $m_2 = 8$ and $k = 6$, blocks 4 and 8 fall into the character image area, block 7 falls into the intermediate area, and blocks 1, 2, 3, 5 and 6 fall into the continuous-tone image area. In this case, blocks 4 and 8 are simply quantized in binary with a signal threshold value of $k = 6$, block 7 is quantized in binary using the threshold levels shown in FIG. 4A, and blocks 1, 2, 3, 5 and 6 are quantized in binary using the threshold levels shown in FIG. 2. The result of binary coding is shown in FIG. 5.

The example described above is the reproduction of 17 tone levels. Reproduction of 18 tone levels or more can be achieved using larger threshold matrices having more threshold levels. For example, reproduction of 65 tone levels is possible using 8-by-8 threshold matrices. In addition to the threshold arrangement shown in FIG. 2, various threshold arrangements as shown, for example, in FIGS. 6A, 6B, 6C and 6D can be used. Various processing methods for reproducing halftones for each area can be employed in addition to the foregoing ordered dither method and the method using a single threshold level. For example, the mean optical density level of a block is detected and the number of black picture elements is determined corresponding to the mean optical density level, then the black picture elements are disposed in the descending order of the image signal level.

Figures 7A, 7B, 7C, 8A, 8B, 8C, 8D:
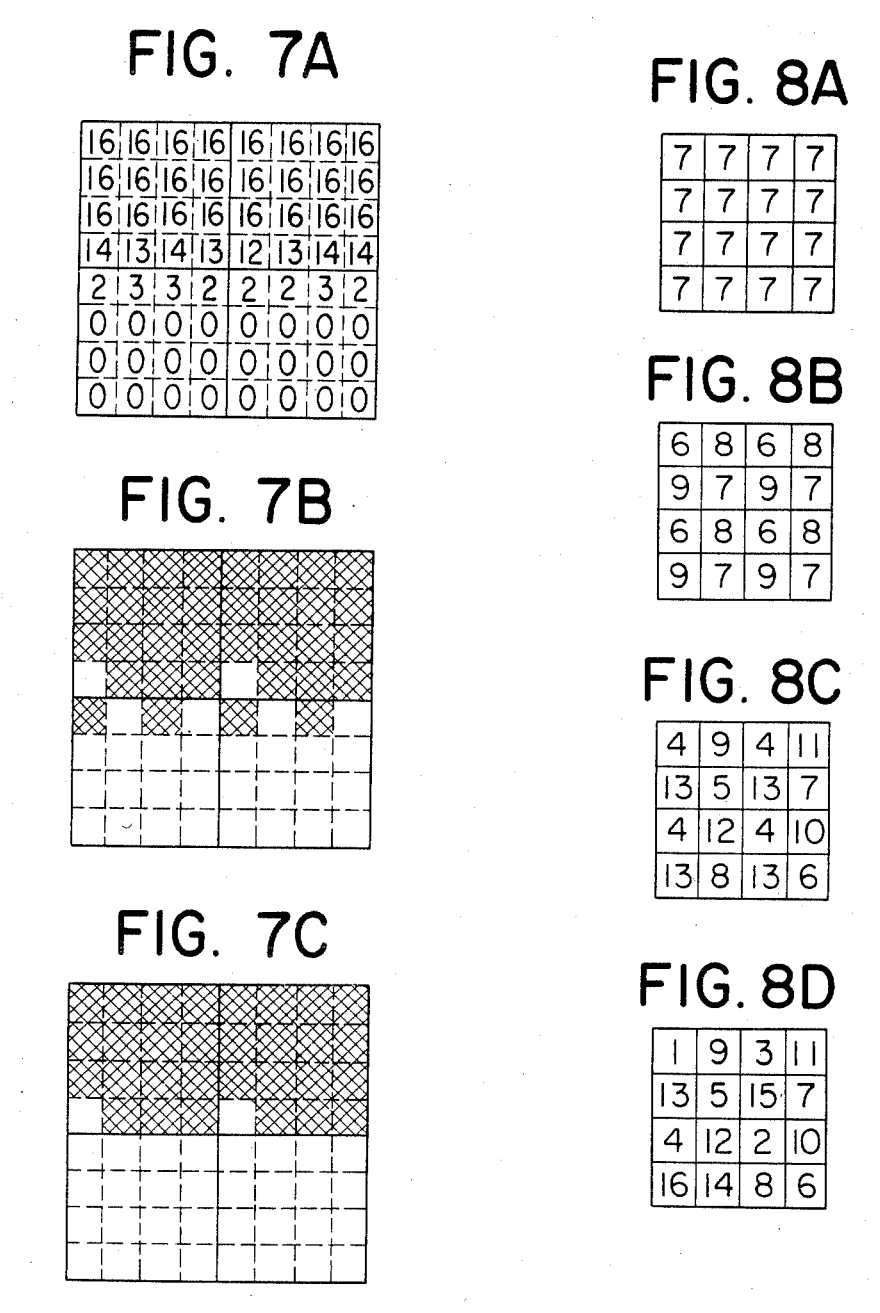

Picture elements at lower threshold levels in the threshold matrix are liable to be determined black. When a block belonging to the character image area is categorized as $P_\Delta < m_1$, some white picture elements in the background turn to black due to the binary quantization process at lower thresholds in the threshold matrix, resulting in a deterioration of the picture quality. In order to eliminate this problem, all picture elements within the block may be made white when the mean optical density of the block is lower than the predetermined value q. FIG. 7 shows an example of processing with the optical density levels of 0-16 for the block size of 4-by-4 matrix. FIG. 7B shows the result of binary quantization for the picture signals shown in FIG. 7A in the same process as in the case of FIG. 5 with parameters being set as: $m_1 = 4$, $m_2 = 7$ and $k = 6$. FIG. 7C shows the result of binary quantization obtained in such a way that the mean optical density of each block is first obtained and all picture elements in a block are made white level when the mean optical density is lower than 0.75, while blocks with mean optical density higher than or equal to 0.75 are processed in the same way as shown in FIG. 7B. The result of FIG. 7C shows plainer black/white boundary than that of FIG. 7B.

An original document containing black and white picture images such as characters and line drawings often causes blocks to include only black or white picture elements. According to the foregoing processing method, such entire black or entire white blocks are categorized as the continuous-tone image area and processed by the above-mentioned process. However, the same result of processing will be reached when the blocks are categorized as the characters image area. If the process is followed by the correction of regional determination which will be described hereinafter, this block is suitably categorized as the character image area. Accordingly, entire black or entire white blocks, even in the case of $P_\Delta < m_1$, may be categorized as the character image area. In the foregoing embodiment, blocks are classified into three areas. However, various modifications are possible for the method of classification. For example, blocks may be classified into two areas (in this case, $m_1 = m_2$) excluding the intermediate area, or may be classified into four or more areas.

In the foregoing embodiment, each block is classified into three kinds of areas. However, many variations and modifications are possible for classification. For example, blocks may be classified into two areas excluding intermediate areas (in this case, $m_1 = m_2$), or into four or more areas.

For the 2-area classification with the reference value ($m_1 = m_2$) being set to approximately half of the black level, a satisfactory picture quality has been obtained for both character images and continuous-tone images.

When a block having 4-by-4 picture elements is classified into four areas and each picture element within the block is quantized according to the classification, the difference $P_\Delta$ of optical density levels is compared with predetermined values $m_1$, $m_2$ and $m_3$ ($m_1 \leq m_2 \leq m_3$). According to the result of comparison, a constant threshold matrix as shown in FIG. 8A is used for the case of $P_\Delta > m_3$, a threshold matrix with narrow threshold distribution as shown in FIG. 8B is used for the case of $m_3 \geq P_\Delta > m_2$, a threshold matrix with a wider threshold distribution as shown in FIG. 8C is used for the case of $m_2 \geq P_\Delta > m_1$, and a threshold matrix with 16 threshold levels as shown in FIG. 8D is used for the case of $m_1 \geq P_\Delta$, so that the number of reproduction tones increases as the value of $P_\Delta$ decreases, while the distribution of threshold value approaches a constant level as the value of $P_\Delta$ increases. The block arrangement with 8-by-8 picture elements can be used to reproduce 64 tones, based on the same principle as described above.

Figure 9:
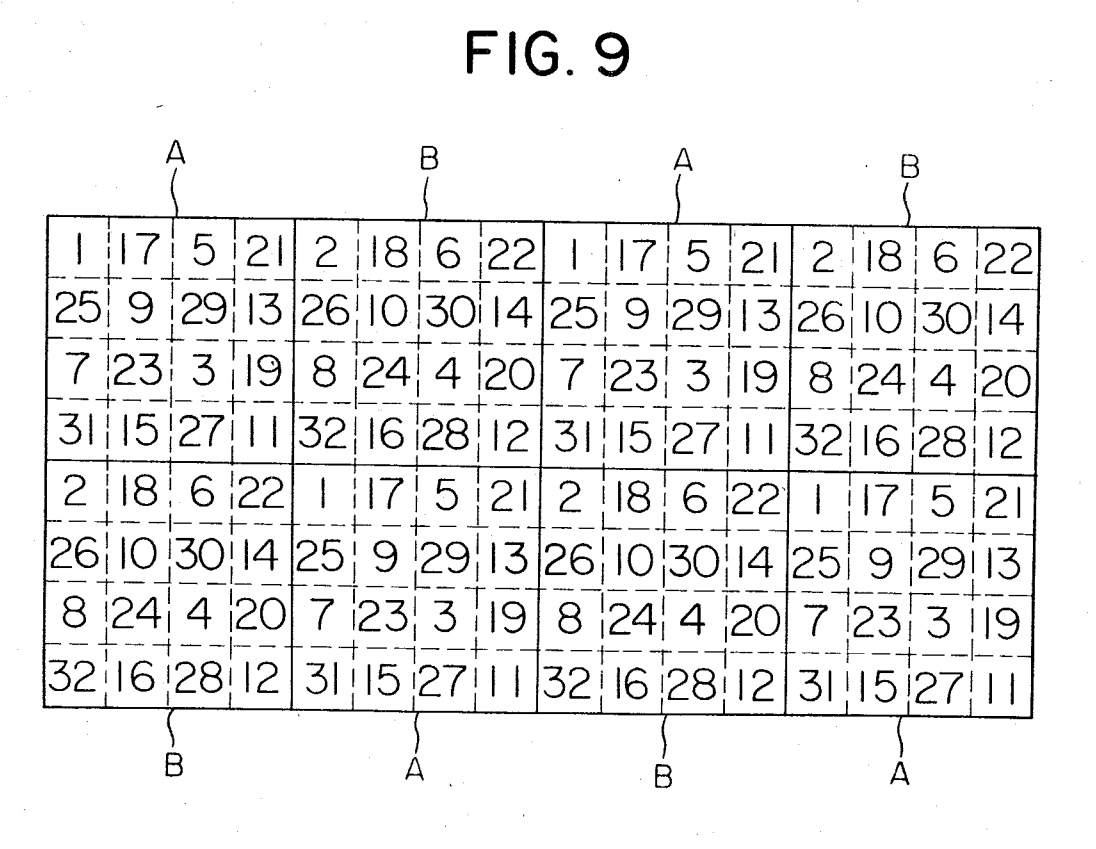

In the foregoing embodiments, the block size for determining the area is made equal to the size of the threshold matrix, however, they need not always be equal. For example, FIG. 9 shows the threshold arrangement used for the continuous-tone image area in 33-tone reproduction, wherein two 4-by-4 threshold matrices A and B are provided as the threshold matrix corresponding to a 4-by-4 block. One of A and B is selected for the threshold matrix corresponding to each block depending on the location of the block.

Figure 10:
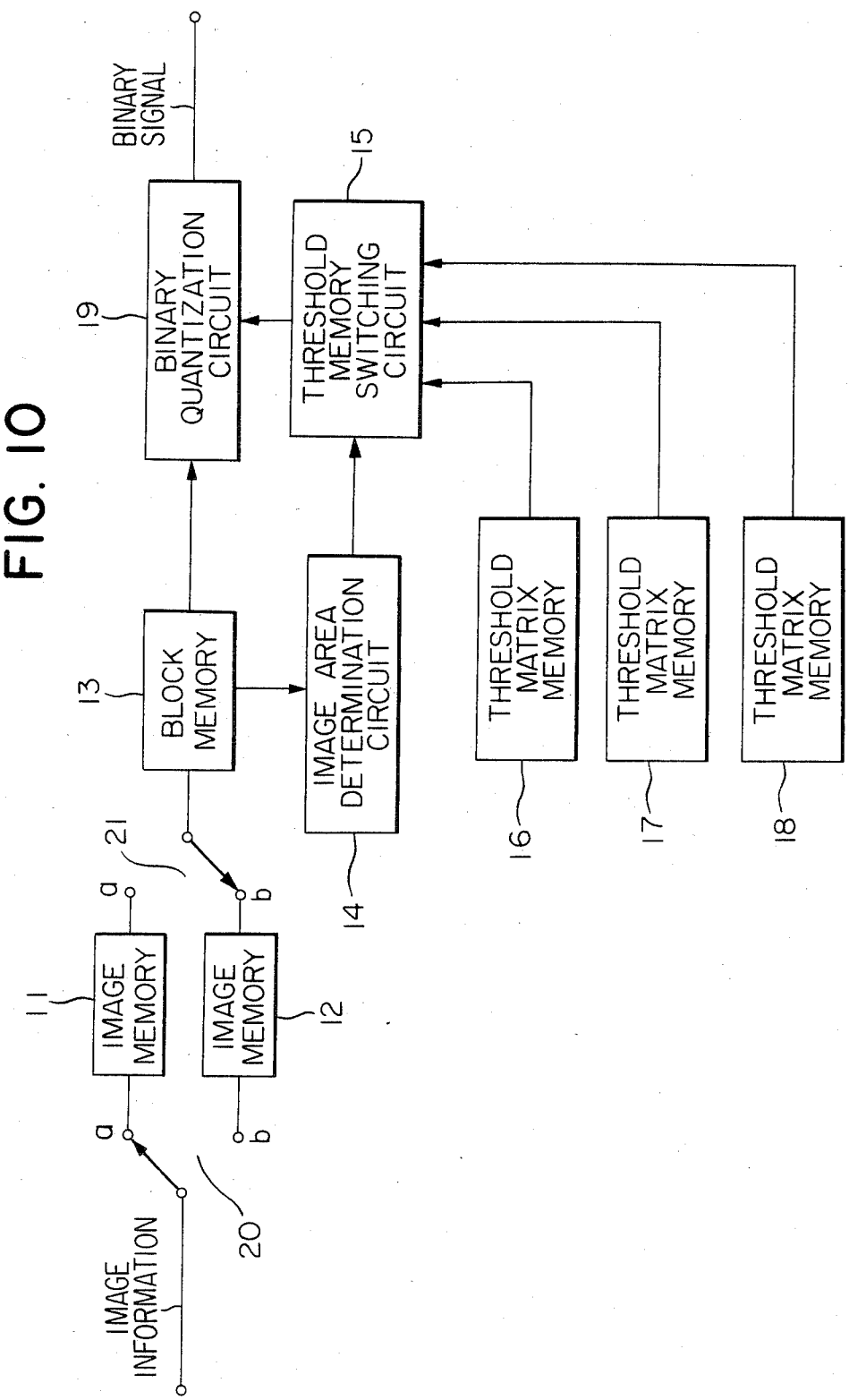
FIG. 10 is a block diagram of the gray level signal processing apparatus embodying the present invention.

FIG. 10 is a block diagram showing the gray level signal processing system embodying the present invention. The system includes two image memories 11 and 12 for storing image information derived from an original document, a block memory 13 for storing image information of one block, an image area determination circuit 14 for determining the areas to which belongs a 1-block image in the block memory, three threshold matrix memories 16, 17 and 18 for storing separate threshold matrix, a threshold memory switching circuit 15 for selecting one of the threshold matrix memories in accordance with the output of the determination circuit 14, a binary quantization circuit 19 for transforming the image information in the block memory 13 into binary data using a selected threshold matrix, and switches 20 and 21 for switching the inputs and outputs of the image memories 11 and 12.

The operation of the arrangement is as follows. First, image information read out from an original document is stored in the image memory 11. After image information on four scanning lines has been stored in the image memory 11, the switch 20 is turned from side a to side b, while at the same time the switch 21 is turned from side b to side a. Then, the next image information is stored in the image memory 12 and at the same time the contents of the image memory 11 are transferred, one block at a time, to the block memory 13. The image area determination circuit 14 detects the maximum and minimum optical density levels of picture elements in a block and provides the difference of these optical density levels. Then, the circuit 14 compares the differential level with preset values $m_1$ and $m_2$, and determines the area of image information of the block as one of the continuous-tone area, intermediate area and character image area in accordance with the result of the comparison. According to the result of determination, the threshold memory switching circuit 15 selects one of the 4-by-4 threshold matrix memory 16 with many threshold levels for continuous-tone images, the 4-by-4 threshold matrix memory 17 with threshold levels for the intermediate area and the 4-by-4 threshold matrix memory 18 with a constant threshold level.

The contents of one of the threshold matrix memories 16, 17 and 18, which is selected as mentioned above, are compared with the optical density level stored in the block memory 13 by the binary quantization circuit 19. The circuit 19 provides a binary signal of black if the optical density level is higher than the threshold level, or provides a binary signal of white if the optical density level is lower than the thereshold level. After the image signal in the block memory 13 has been processed, the next 1-block image information is transferred from the image memory 11 to the block memory 13, then transformed into binary signal in the same way as described above. After entire information in the image memory 11 has been processed and image information for the next four scanning lines has been stored in the image memory 12, the switch 20 is turned from side b to side a and the switch 21 is turned from side a to side b, then the contents of the image memory 12 are processed in the procedures described above.

FIG. 11 shows an example of the image area determination circuit for separating an image into two areas. The arrangement includes a temporary memory 101, a control circuit 102, an arithmetic circuit 103, a maximum level memory 104, a minimum level memory 105, and a reference value memory 106. The temporary memory 101 may be provided commonly with the block memory 13 shown in FIG. 10. In operation, the 1-block image signal is stored in the temporary memory 101. One block consists of 16 picture elements corresponding to signals $P_{i(i=1-16)}$. First, signal $P_1$ is stored in the maximum level memory 104 and the minimum level memory 105. Then, signal $P_2$ is fed to the arithmetic circuit 103 so that it is compared with the contents $P'_{max}$ of the maximum level memory 104.

If $P_2$ is smaller than or equal to $P'_{max}$, the contents of the memory 104 is left unchanged, or if $P_2$ is larger than $P'_{max}$, the contents of the maximum level memory 104 is replaced by $P_2$. Next $P_2$ is compared with the contents $P'_{mim}$ of the minimum level memory 105. If $P_2$ is larger than or equal to $P'_{min}$, the contents of the memory 105 is left unchanged, or if $P_2$ is smaller tha $P'_{min}$, the contents of the minumum level memory 105 is replaced by $P_2$. Subsequently, signals $P_3$, $P_4$, ... and $P_{16}$ are fed to the arithmetic circuit sequentially and the same process takes place repeatedly. After signal $P_{16}$ has been processed, the contents of the maximum level memory 104 and the minimum level memory 105, i.e., $P'_{max}$ and $P'_{min}$, indicate the maximum optical density level $P_{max}$ and the minimum optical density level $P_{min}$ of the block. The contents of the memories 104 and 105 are fed to the arithmetic circuit 103 so that the difference is calculated, then the difference of optical density levels in the block, $P_\Delta$, is obtained. The value $P_\Delta$ is compared with the contents m of the reference value memory. When the value $P_\Delta$ is larger than or equal to the reference value m, a signal "1" indicating the character image area is produced, or when the value $P_\Delta$ is smaller than the reference value m, a signal "0" indicating the continuous-tone image area is produced. The area indicating signal is applied to the threshold memory switching circuit. In order that an area indicating signal of the block is recognized as the character image area when all picture elements in the block are black or white, it is checked when the minimum optical density level is the black level or the maximum optical density level is the white level, and in both cases the area indicating signal set to a signal "1". The foregoing operation are repeated for the subsequent blocks sequentially.

Figure 12A:
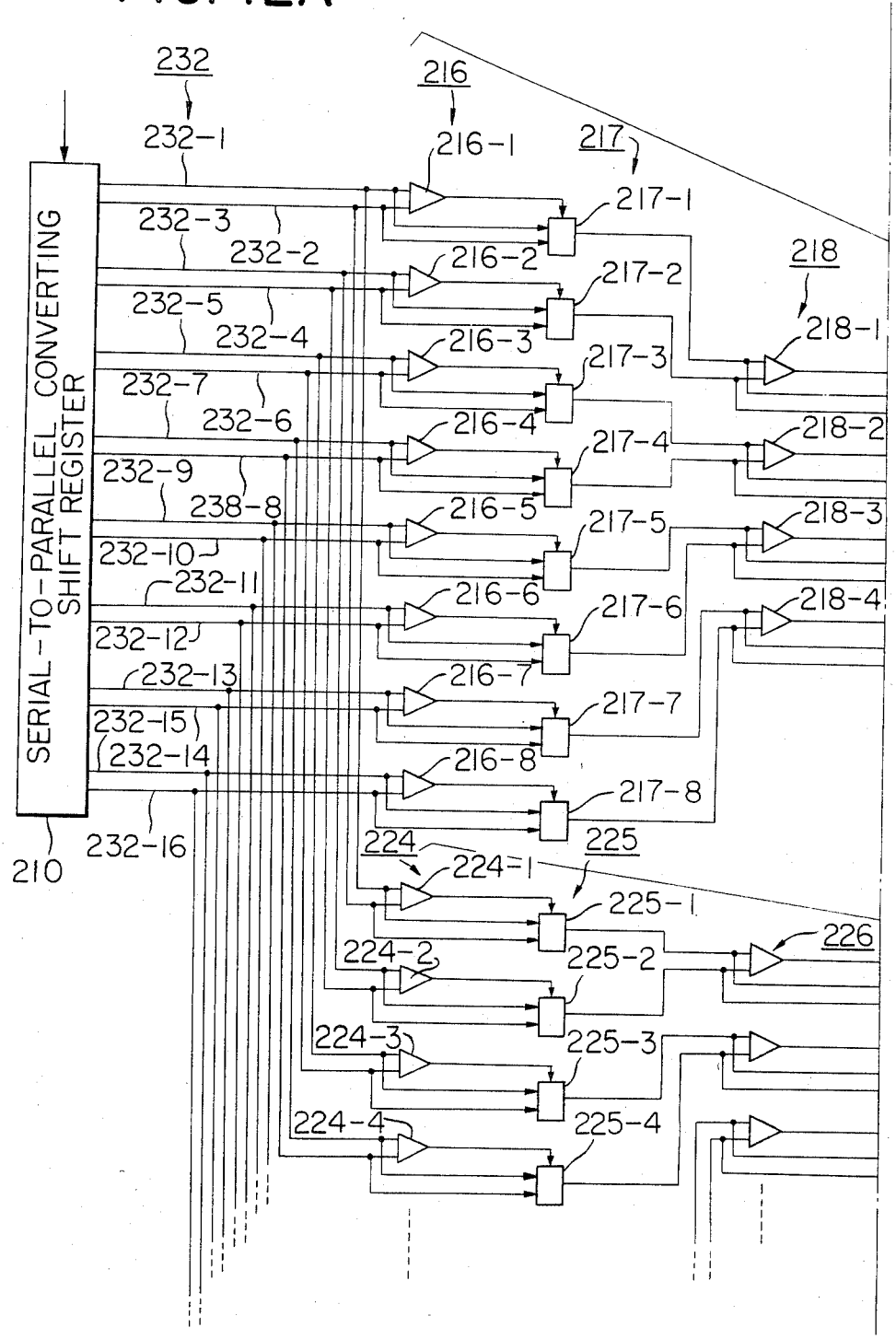
FIGS. 12A and B are circuit diagrams showing another example of the image area determination circuit used in the apparatus of FIG. 10.

FIG. 12 shows another example of the image area determination circuit which categorizes a picture image elements into two areas. The arrangement, which allows the high-speed processing, includes a serial-to-parallel converting shift register 210, a maximum optical density level extracting circuit 211 made up of comparators and selectors, a minimum optical density level extracting circuit 212 made up of comparators and selectors, an arithmetic circuit 213, a reference value generator 214, and a comparator 215.

In operation, the 1-block image signal is latched in the shift register 210, then passed through the terminals 232 to the comparators 216. For example, the comparator 216-1 receives via the terminals 232-1 and 232-2 image signals $P_1$ and $P_2$ of two picture elements out of 16 picture elements. If the input at terminal 232-1 is larger than the input at terminal 232-2, the comparator 216-1 provides a signal "1", otherwise it provides a signal "0". The selector 217-1 conducts the image signal at terminal 232-1 in response to the signal "1" from the comparator 216-1, or conducts the signal at terminal 232-2 in response to the signal "0" from the comparator. Consequently, one of the image signals at terminals 232-1 and 232-2 having a larger optical density level will appear at the output of the selector 217-1. In the same way, each of the selectors 217 provides one of the comparator inputs having a larger optical density level. Similarly, signals having larger optical density levels are selected by the arrangement of comparators 218, 220 and 222, and selectors 219, 221 and 223, and finally, the selector 223 provides the image signal having the maximum optical density level out of the signals stored in the shift register 210. The outputs of the shift register 210 are at the same time supplied to comparators 224. For example, the comparator 224-1 receives via terminals 232-1 and 232-2 image signals $P_1$ and $P_2$ for two picture elements out of 16 picture elements. If the input at terminal 232-1 is larger than the input at terminal 232-2, the comparator 224-1 provides a signal "1", otherwise it provides a signal "0". For the selector 225-1, as oppose to the case of the selector 217-1, when the input from the comparator 224-1 is a signal "1", the image signal at terminal 232-2 is selected, or when the input signal is a signal "0", the image signal at terminal 232-1 is selected. In the same way, signals having smaller optical density levels are selected sequentially by comparators 224, 226, 228 and 230, and selectors 225, 227, 229 and 231, and finally, the selector 231 provides the image signal having the minimum optical density out of the image signals for the block stored in the shift register 210. The arithmetic circuit 213 calculates the difference between the optical density levels provided by the selectors 223 and 231, and delivers the result to the comparator 215. The comparator 215 compares the difference value of optical density levels in the block $P_\Delta$, provided by the arithmetic circuit 213 with the reference value m provided by the reference value generator 214. When the difference value $P_\Delta$ is larger than or equal to reference value m, the comparator 215 provides a signal "1" indicating the character image area, or when the difference value $P_\Delta$ is smaller than reference value m, the comparator provides a signal "0" indicating the continuous-tone image area.

In FIG. 12, the connection at the signal input/output terminal is illustrated using one line for each image signal for purposes of simplicity, however, there are a plurality of lines in the actual circuit. For example, if the signal of the original document is a digital signal having 16 levels, it is transferred over 4-bit lines.

Next, an embodiment of the invention employing the multi-level dither method which reproduces several gray level for each picture element will be described.

An image is divided into blocks each consisting of a plurality of picture elements. The difference between the maximum optical density level and the minimum optical density level of the picture elements is obtained for each block. The difference of optical density levels is compared with a single or a plurality of reference values so that each block is categorized into the character image area, the continuous-tone image area or the intermediate area. For example, when the image shown in FIG. 1 is evaluated with reference values of $m_1 = m_2 = 8$, blocks 4 and 8 are categorized as the character image area and remaining six blocks are categorized as the continuous-tone image area. The following will describe the processing for each area.

(a) The multi-level halftone reproduction method which is stable against to recording and also provides satisfactory tone reproductivity is employed for blocks categorized as the continuous-tone image area. An assumption is made that five picture element densities, $D_1$ (white), $D_2$, $D_3$, $D_4$ and $D_5$ (black) are possible. The threshold matrix is assumed to be a 4-by-4 arrangement as shown in FIG. 13. The threshold arrays shown in FIG. 13 feature that the effect of uneven recording can be minimized by carrying out the intermediate reproduction for only one picture element out of four picture elements, resulting in a satisfactory halftone reproduction. In processing, the threshold matrix shown in FIG. 13A is used to compare the image signal level with the threshold level corresponding to the location of the picture element, and when the signal level is smaller than the threshold level, the picture element density is made the density level $D_1$. When the signal level is larger than the threshold level, the signal is further compared with the threshold matrix shown in FIG. 13B, and when the signal level is smaller than the threshold level, the picture element density is made the density level $D_2$. When the signal level is larger than the threshold level, the signal is further compared with the threshold matrix shown in FIG. 13C, and when the signal level is smaller than the threshold, the picture element density is made the density level $D_3$. Again, when the signal level is larger than the threshold level, the signal is compared with the threshold matrix shown in FIG. 13D, and when the signal level is smaller than the threshold, the picture element density is made the density level $D_4$, otherwise it is made the density level $D_5$. FIG. 14 shows the result of the foregoing process for blocks 6 and 7 of the continuous-tone image area shown in FIG. 1. In FIG. 14, reference numerals $D_1$–$D_5$ represent each reproduced picture element density. Multi-level halftones reproduction method using the threshold arrays shown in FIG. 13A to 13D are used here, however, other processing method may be employed.

(b) Simple multi-state recording is carried out for blocks categorized as the character image region in order to get high the resolution. That is, one of levels D1–D5 nearest to the signal level is selected for reproduction. More particularly, the reproduced density is determined in the same procedures as in the case of FIGS. 13A to 13D using threshold levels, for example, as shown in FIGS. 15A, 15B, 15C and 15D. FIG. 16 shows the result of the processing for blocks 4 and 8 of the character image area shown in FIG. 1.

Separating an image into three kinds of area can be accomplished by the similar process using the theshold levels of FIGS. 17 to 17D as the threshold matrix for the intermediate region. Separation into more than three kinds of regions can also be achieved similarly using threshold matrices with a distribution of threshold levels (FIGS. 17A–17D) becoming narrower as the difference of optical density levels increases.

Figure 18:
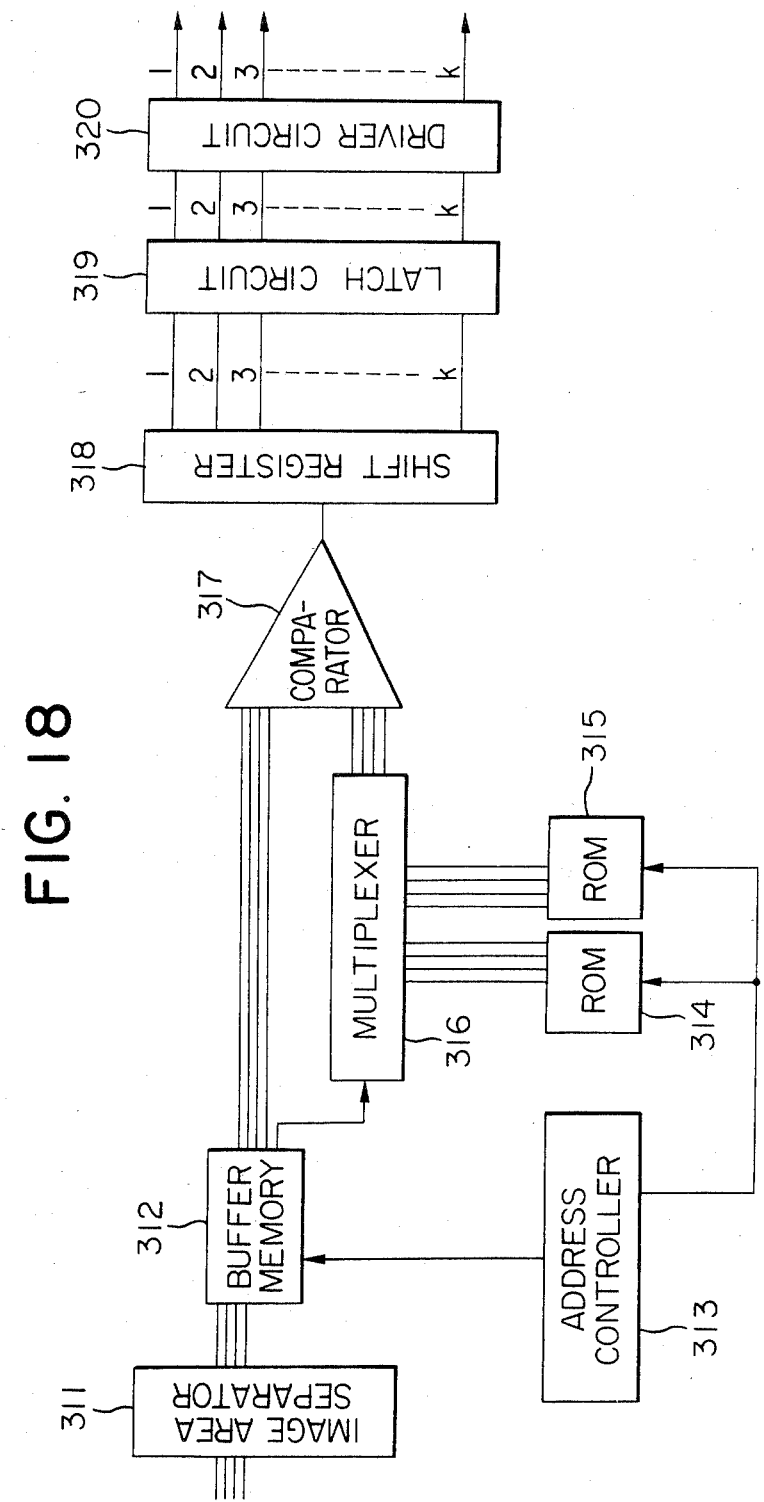
FIG. 18 is a block diagram showing an embodiment of the gray level signal processing circuit for a multi-level quantizing process wherein the image area is divided into the continuous-tone image area and the character image area.

FIG. 18 shows an example of the recording circuit arrangement for carrying out the method of the embodiment employing the foregoing multi-level dither method, wherein an image is separated into the continuous-tone image area and the character image area. The arrangement in FIG. 18 records k picture elements at one time. The image signal has information of 16 kinds of tones. Each picture element can be recorded at five levels. An image area separator 311 distinguishes continuous-tone image signals and character image signals, and sends the image signals, with an image area idicating signal appended thereto, to a buffer memory 312.

(A) The buffer memory 312 stores image signals for to picture elements. The tone information of the first image signal stored in the buffer memory 312 is delivered to a comparator 317 and the image area indicating signal is delivered to a multiplexer 316. An address controller 313 supplies address information of threshold values to ROM 314, ROM 315. The ROM 314 stores four threshold arrays for the character image area as shown in FIG. 15. These ROMs supply threshold levels corresponding to the address information provided by the address controller 313 to the multiplexer 316. The multiplexer 316 receives a threshold level in the first threshold array in FIGS. 13A and 15A in the ROM 314 and ROM 315 corresponding to the address information. The multiplexer 316 conducts the threshold level which has been read in the ROM 314 or ROM 315 to the comparator 317, depending on the area indicating signal transfered from the buffer memory 312. The comparator 317 compares the optical density level in the image signal sent from the buffer memory 312 with the threshold level, and provides the shift register 318 with a signal "1" if the image optical density level is larger than the threshold level, or signal "0" when the optical density level is smaller than the threshold level. The remaining image signals stored in the buffer memory 312 are processed in the same way, and after a signal "1" or a signal "0" caused by the k-th image signal is sent to a shift register 318, a latch circuit 319 provides k signals for a driver circuit 320. The driver circut 320 energizes recording elements or display elements in response to signals "1", for example, until the process of the subsequent step (B) completes.

(B) The same process as in step (A) takes place for the same k image signal as used in step (A) using the second threshold array in FIGS. 13B or 15B, stored in the ROM 314 or ROM 315. It is assumed that the process of step (B) takes T seconds.

(C) The same process as in step (A) takes place using the third threshold arrays stored in the ROM 314 or ROM 315.

(D) The same process as in step (A) takes place using the fourth threshold array. The driver circuit 320 is activated for T seconds in response to k signals produced as a result of the process.

Consequently, the driver circuit 320 is activated for a total length of 4T seconds by the processes of steps (A) through (D). The steps (A) through (D) are repeated for the next k image signals. Since each of the steps (A) through (D) provides an application voltage with a pulse width T in response to a "1" output of the process, the total pulse width will vary in the range of 0-4T depending on the image signal level. Thus, the arrangement of this embodiment transforms the tone information of k image signals into pulse width signals at one time. These pulse width signals for each picture elements are used to energize recording elements or display elements so as to reproduce halftones.

Figure 19:
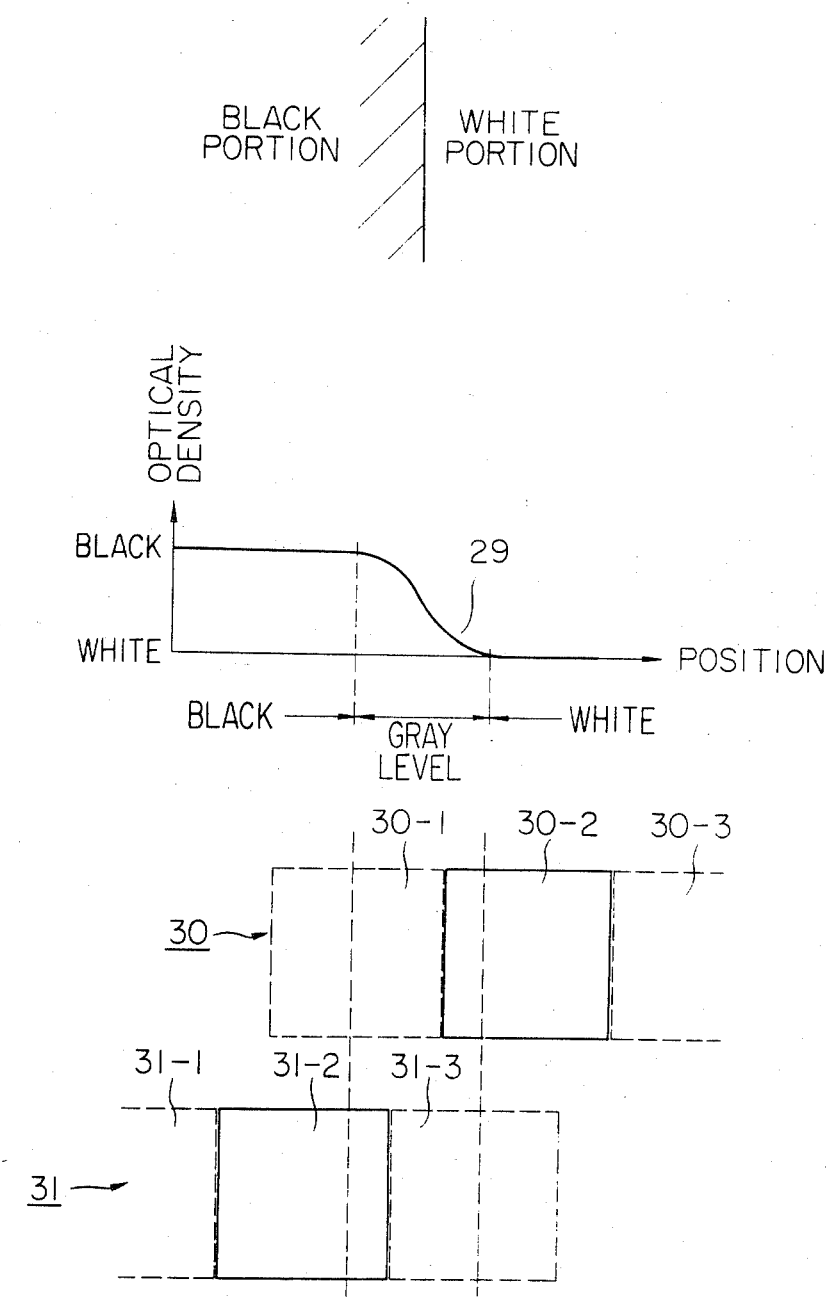
FIGS. 19 and 20 illustrate a method of correcting the area determination.

In determining the image area in the foregoing method, the boundary between a white part and a black part sometimes provides a smaller gradient of optical density levels as shown in FIG. 19, and the image can erroneously be categorized as the continuous-tone area. This results in a deterioration of the character quality, but almost erroneous determination in the case of the 2-area system can be corrected in the following way. It is very rare for a continuous-tone block to exist isolately in the continuous-tone image. Therefore, if a block is categorized as the continuous-tone image area, it often means that with a high probability a character image area is erroneously categorized as the continuous-tone image area. In FIG. 19, reference numbers 30 and 31 show the spatial relationship between the block and the image on adjcument. When the boundary portion between black and white is read, the signal has gray levels as shown by 29 in the figure due to the limited resolution of the reading device. Block 30-1 is defined as the character image area, since it has a large difference in optical density. Block 30-3 is composed of only white picture elements, and it is categorized as the character image area. Block 30-2 includes low-level (near white) picture elements in addition to white picture elements, and thus it is categorized as the continuous-tone image area. Block 31-2 with the spatial relationship shown by 31 is categorized as the continuous-tone image area. The adjacent block 31-1 is composed of only black picture elements and it is categorized as the character image area. Block 31-3 has a large optical density level difference and it is categorized as the character image area. In case the image and block have the spatial relationship shown by 30 or 31, blocks on both sides of block 31-2 or block 30-2 which has been categorized erroneously or are categorized as the character image area. Therefore, if blocks on both sides of three consecutive blocks in the horizontal scanning direction or vertical scanning direction are categorized as the character image area, the intermediate block is categorized as the character image area (i.e., the first correction) irrespective of the primary determination result, thereby correcting the erroneous determination of the area.

Figure 20:
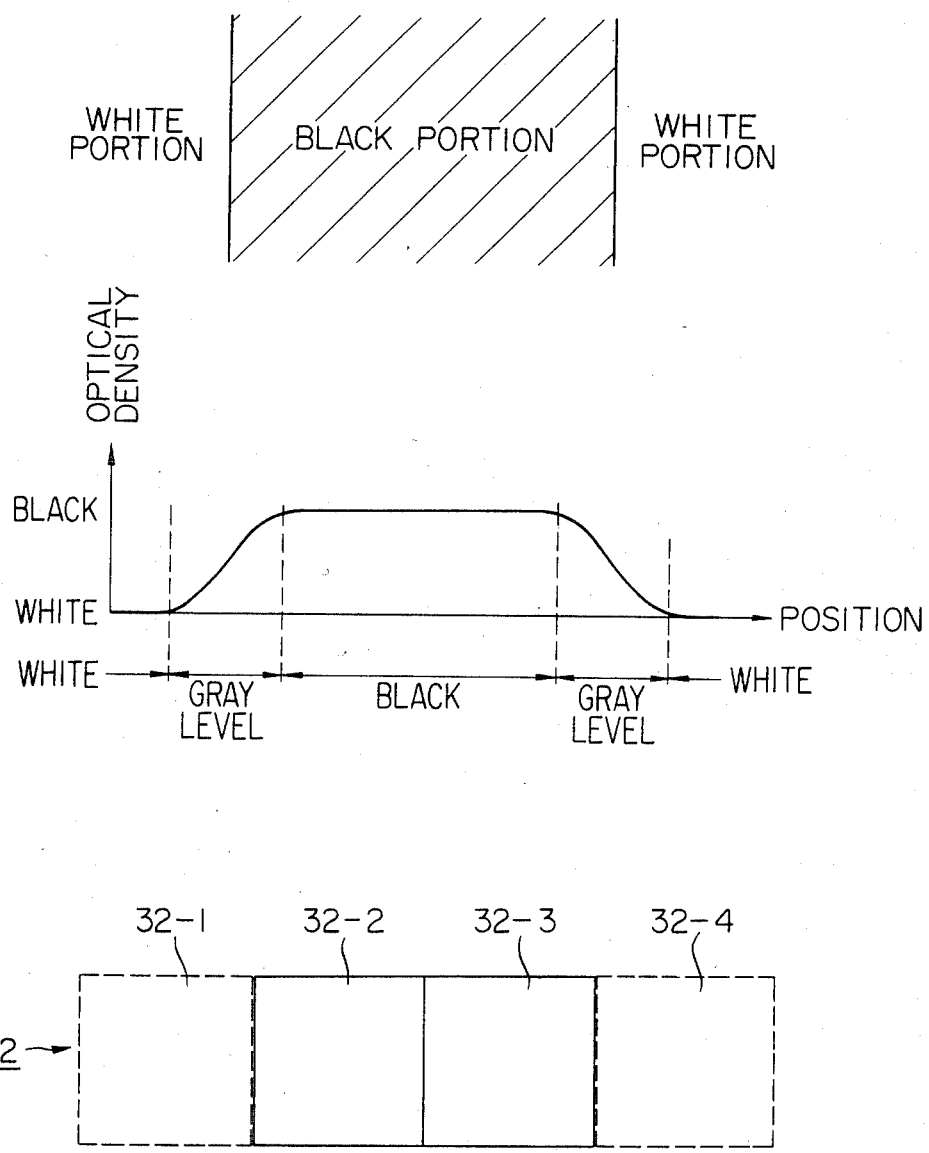

In case a character image includes a line having a width as large as two-block width as shown in FIG. 20, two consecutive blocks, such as blocks 32-2 and 32-3, could be categorized erroneously as the continuous-tone area. In this case, blocks on both sides of the consecutive blocks have large optical density differences, and they are categorized as the character image area. Accordingly, if the outer two blocks of four consecutive blocks are categorized as the character image area, the intermediate two blocks are categorized as the character image area (the second correction) irrespective of the result of the primary determination, thereby correcting the erroneous determination.

According to the computer simulation, the improvement in the quality has been recognized for the character image processed merely for the first correction, and a further improvement in the character image has been recognized by carrying out the first and second correcting processes. However, the effect of correction in determining the area has not been recognized on the quality of picture such as of photographs.

It is considered as a very rare case that three blocks in a character image are categorized as the continuous-tone area consecutively, and it is sufficient to carry out the correction only when one or two blocks are categorized as the continuous-tone image area isolatedly as described above.

FIG. 21 shows an embodiment of the invention for separating an image into two areas accompanied by the correction of the erroneous determination. The arrangement includes 4-line memories 413 and 414, a block memory 415 formed of shift registers, a shift register 416, a primary area determination circuit 417, an area determination correcting circuit 418, a threshold memory 419, a threshold memory selecting circuit 420, a binary quantization circuit 421, and 4-line memories 422 and 423.

In operation, first, a switch 424 is turned to side a and a switch 425 is turned to side b so that the image signal is stored in the 4-line memory 413. After 4-line image signals have been stored in the memory 413, the switch 424 is turned from side a to side b, and the switch 425 from side b to side a so that the subsequent 4-line image signals are stored in the 4-line memory 414. The image signals stored in the 4-line memory 443 are read out sequentially, for one block at a time, and stored in memory area 415-1 of the block memory 415. The contents of the block memory are processed by the primary area determination circuit 417 so that the image portion is categorized as the character image area or the continuous-tone area. The circuit 417 provides a area indicating signal "1" in case of the character image area, or an area indicating signal "0" in case of the continuous-tone image area, then delivers the signal to the shift register 416. After the area determination for the first block, the contents of the memory area 415-1 of the block memory are shifted to the memory area 415-2, and the image signals of the next block is stored in the memory area 415-1 and processed in the same way. In this case, the transfer of signals within the block memory need not be carried out serially to the determination of the area, but a parallel processing is possible by processing the contents of the memory area 415-1 after it has been delivered to the area determination circuit at a certain timing. In this way, the image signal for each block is propagated through the memory areas 415-1, 415-2, 415-3 and 415-4, while at the same time the area indicating signal indicating the result of the area determination is transferred in the shift register 416 in synchronization with the transfer for the image signal in the block memory 415. In the arrangement of FIG. 21, the primary area determination is carried out after the image signal for one block has been stored in the memory area 415-1, and the image signals are transferred from the memory area 415-1 to the memory area 415-2 simultaneously to the entry of the area indicating signal indicating the result of determination into the memory area 416-1 of the shift register 416. Accordingly, the area indicating signals for the block formed of the image signals in the memory area 415-2, 415-3 and 415-4 are stored in the memory areas 416-1, 416-2 and 416-3 of the shift register 416, respectively. The area indicating signal in the memory area 416-4 of the shift register 416 is the signal for the image signal of a block preceding the contents of the memory area 415-4 of the block memory 415, and it is already erased in the block memory 415.

The contents of the shift register 416 are processed by the area determination correcting circuit 418. An AND gate 428 is used to check if both memory areas 416-1 and 416-3 indicate the character image area, and if the AND gate 428 provides an output signal "1", the block of the image signal corresponding to the memory area 416-2 is categorized as the character image area. Another AND gate 429 checks if both memory areas 416-1 and 416-4 indicate the character image area, and if the AND gate 429 provides an output signal "1", the blocks corresponding to the memory areas 416-2 and 416-3 are categorized as the character image area. OR gates 430, 431 and 432 are provided so that blocks corresponding to the image signals in the memory areas 415-3 and 415-4 are categorized as the character image area irrespective of the contents of the memory areas 416-2 and 416-3 if either of the AND gate 428 or 429 provides an output signal "1". A block delay circuit 433 and an OR gate 434 are used to take the result of determination in synchronization with the block memory. The block delay circuit 433 is a shift register for delaying the output of the OR gate 431 by one block processing time, and the output of the OR gate 434 indicates the result of re-determination for the area indicating signal in the memory area 416-3 of the shift register 416. Accordingly, the image signal block in the memory area 415-4 of the block memory 415 is processed for binary quantization basing on the result of re-determination of area by the area determination correcting circuit 418. The output of the area determination correcting circuit 418 is delivered to the threshold memory selecting circuit 420 to select an appropriate threshold matrix in the threshold memory 419, and the selected matrix is delivered to the binary quantization circuit 421. The binary quantization circuit 421 compares the image signal of each block sent from the block memory 415 with threshold levels provided by the threshold memory 419, and transforms the image signal into binary signal. The image signal processed into binary for each block is converted into a line-sequential signal by the 4-line memories 422 and 423. After 4-line image signals have been processed, the switches 424 and 425 are switched, and the next 4-line signals are processed.

In the embodiment of FIG. 21, if blocks on both sides of three or four consecutive blocks are the character image area, the intermediate block or blocks are categorized again as the character image area, i.e., both the first and second correcting processes are carried out. However, only the first correcting process can take place by turning off a switch 435.

The method of correcting the area determination according to the present invention can be applied to other methods than that of determining the area basing on the difference of optical density levels within a block. It is also possible to apply the invention to the extraction of continuous-tone image portions basing on the area determination for each block.

According to the present invention, as described above, an image is separated in block units into an area where numerous tone reproduction is stressed, an area where high resolution is stressed, and when necessary, an area where the intermediate area is reproduced, whereby satisfactory reproduction is achieved for an original document which includes photographic images and character images.

The methods of the present invention is useful when applied to the facsimile system including continuous-tone or halftone information or the process in a copy machine which reads and records a picture in units of picture elements.

We claim:

1. A method of image area determination comprising the steps of:
   dividing a pictorial image into blocks, each block being composed of a plurality of picture elements;
   detecting the maximum optical density level ($P_{max}$) and the minimum optical density level ($P_{min}$) among optical density levels of picture elements for each block;
   providing the difference value ($P_\Delta$) between said maximum optical density level ($P_{max}$) and said minimum optical density level ($P_{min}$);
   comparing said difference value ($P_\Delta$) with a reference value;
   detecting the state in which optical density levels of all picture elements in a block are at white level or at black level; and
   determining said block to be a character image area when said difference value ($P_\Delta$) is larger than said reference value or when said optical density levels of all picture elements in said block are at white level or at black level, otherwise determining said block to be a continuous-tone image area.

2. A gray level signal processing method comprising the steps of:
   dividing a pictorial image into blocks, each block being composed of a plurality of picture elements;
   detecting the maximum optical density level ($P_{max}$) and the minimum optical density level ($P_{min}$) among optical density levels of picture elements for said each block;
   providing the difference value ($P_\Delta$) between said maximum optical density level ($P_{max}$) and the minimum optical density level ($P_{min}$);
   determining an image area to which each said block belongs according to said difference value ($P_\Delta$);
   selecting one of a plurality of threshold matrices is selected according to the result of determination of the image area to which each said block belongs; and
   quantizing the optical density level of each picture element in each said block in binary with said selected threshold matrix.

3. A gray level signal processing method according to claim 2 wherein the mean optical density level of a block is obtained, and all picture elements in said block are determined as being at white level when said mean optical density level is smaller than a reference value.

4. A gray level signal processing method according to claim 2 wherein said plurality of threshold matrices are arranged such that many threshold levels are provided for threshold matrices applied to blocks having a smaller difference value ($P_\Delta$) between the maximum optical density level and the minimum optical density level, and the number of threshold levels decreases and approaches a certain value as said difference value ($P_\Delta$) increases.

5. A gray level signal processing method according to claim 2 wherein threshold levels in a threshold matrix applied to a character image area are at a same threshold level.

6. A method of image area determination comprising the steps of:
   dividing a pictorial image into blocks, each block being composed of a plurality of picture elements;
   detecting the maximum optical density level ($P_{max}$) and the minimum optical density level ($P_{min}$) among optical density levels of picture elements for each block;
   providing the difference value ($P_\Delta$) between said maximum optical density level ($P_{max}$) and said minimum optical density level ($P_{min}$);
   comparing said difference value ($P_\Delta$) of said optical density levels with a reference value;
   identifying each said block as a character image area when said difference value ($p_\Delta$) is larger than said reference value; and
   identifying each said block as a continuous-tone image area when said difference value ($P_\Delta$) is smaller than said reference value.

7. A method of image area determination comprising the steps of:
   dividing a pictorial image into blocks, each block being composed of a plurality of picture elements;
   detecting the maximum optical density level ($P_{max}$) and the minumum optical density level ($P_{min}$) among optical density levels of picture elements for each block;
   providing the difference value ($P_\Delta$) between said maximum optical density level ($P_{max}$) and said minmum optical density level ($P_{min}$);
   comparing said difference value ($P_\Delta$) of the optical density levels with a plurality of reference values ($m_1, m_2, \ldots$); and
   based on the result of said comparisons, identifying each said block as one of a character image area, a continuous-tone image area and at least one intermediate area.

8. A gray level signal processing method comprising the steps of:
   dividing a pictorial image into blocks, each block being composed of a plurality of picture elements;
   detecting the maximum optical density level ($P_{max}$) and the minimum optical density level ($P_{min}$) among optical density levels of picture elements for said each block;
   providing the difference value ($P_\Delta$) between said maximum optical density level ($P_{max}$) and the minimum optical density level ($P_{min}$);
   determining an image area to which each said block belongs according to said difference value ($P_\Delta$);
   selecting a set of threshold matrices from a plurality of threshold matrix sets, each set including a plurality of threshold matrices, according to the result of determination of the image area to which each said block belong; and
   quantizing the optical density level of each picture element in each said block in multi-levels by using the selected threshold matrix set.

9. An apparatus for image area determination comprising:
   memory means for temporarily storing levels of picture elements in one block in a pictorial image;
   arithmetic means for comparing optical density levels of the picture elements stored in said memory means so as to obtain the maximum optical density level ($P_{max}$) and the minimum optical density level ($P_{min}$);

arithmetic means for calculating the difference value ($P_\Delta$) between said maximum optical density level and said minimum optical density level;

determination means for comparing said difference value ($P_\Delta$) between said maximum and minimum optical density levels with at least one of predetermined reference values ($m_1, m_2 \ldots m_n$, where $m_1 \leq m_2 \leq \ldots \leq m_n$), and providing and output signal which represents the image area to which said block belongs in accordance with the result of said comparison, said determination means comprising an area determination correcting circuit for initially identifying a block in a pictorial image as an image area in accordance with the difference value between the maximum optical density level and the minimum optical density level, and for thereafter correcting said area determination by referring to the result of area determination for blocks adjacent to the initially identified block.

10. A gray level signal processing apparatus comprising:

detecting means for detecting the maximum optical density level and the minimum optical density level among optical density level of picture elements in successive blocks, each block being composed of a plurality of picture elements;

means for calculating the difference value between said maximum optical density level and said minimum optical density level for each block;

comparing means for comparing each said difference value between said maximum and minimum optical density level with at least one of a plurality of predetermined reference values;

threshold matrix memory means for storing a plurality of threshold matrices;

selecting means for selecting one of said plurality of threshold matrices from said threshold matrix memory means in accordance with the output of said comparing means; and means for quantizing the optical level of each picture element in said block in binary levels by using the threshold matrix selected by said selecting means.

11. A gray level signal processing apparatus according to claim 10, wherein said detecting means comprises:

first memory means for temporarily storing a larger optical density level than that presently stored to obtain said maximum optical density level among optical density levels of picture elements in each said block;

second memory means for temporarily storing a smaller optical density level than that presently stored to obtain said minimum optical density level among optical density levels of picture elements in each said block;

means for successively comparing optical density levels of picture elements in each said block with the content of said first memory and the content of said second memory; and means for replacing the content of first memory by an optical density level when the optical density level is greater than the content of the first memory, and for replacing the content of second memory by an optical density level when the optical density level is smaller than the content of the second memory.

* * * * *